(12) United States Patent  
Morejon et al.

(10) Patent No.: US 7,437,039 B2
(45) Date of Patent: Oct. 14, 2008

(54) OPTICAL ENGINE WITH TIGHTLY COUPLED LIGHT SOURCE

(75) Inventors: Israel J. Morejon, Tampa, FL (US); Jinhui Zhai, Clearwater, FL (US); Tom R. Greenwood, Terra Ceia, FL (US); Mark A. Dickson, Lutz, FL (US)

(73) Assignee: Jabil Circuit, Inc., St. Petersburg, FL (US)

( * ) Notice: Subject to any disclaimer, the term of this patent is extended or adjusted under 35 U.S.C. 154(b) by 0 days.

(21) Appl. No.: 11/256,561

(22) Filed: Oct. 21, 2005

(65) Prior Publication Data

US 2007/0092189 A1 Apr. 26, 2007

(51) Int. Cl.
*G02B 6/04* (2006.01)
(52) U.S. Cl. .............. 385/120; 385/89; 353/31
(58) Field of Classification Search ........... 385/120, 385/88–92; 353/31
See application file for complete search history.

(56) References Cited

U.S. PATENT DOCUMENTS

| | | | |
|---|---|---|---|
| 5,416,624 A * | 5/1995 | Karstensen | ............ 398/139 |
| 5,680,180 A | 10/1997 | Huang | |
| 6,092,935 A * | 7/2000 | Althaus et al. | ............ 385/93 |
| 6,591,022 B2 | 7/2003 | Dewald | |
| 6,748,143 B2 * | 6/2004 | Kuhara et al. | ............ 385/49 |
| 6,767,100 B1 | 7/2004 | Long et al. | |
| 6,830,343 B2 | 12/2004 | Song | |
| 7,093,988 B2 * | 8/2006 | Tsumori | ............ 385/93 |
| 2004/0207816 A1 * | 10/2004 | Omoda et al. | ............ 353/31 |
| 2005/0276553 A1 * | 12/2005 | Kazakevich | ............ 385/115 |

* cited by examiner

*Primary Examiner*—Ellen Kim
(74) *Attorney, Agent, or Firm*—Price, Heneveld, Cooper, DeWitt & Litton, LLP

(57) ABSTRACT

An image presentation device (100) with an associated optical light engine includes one or more semiconductor light emitting diodes or other such devices (122, 124, 126) that are combined to provide a source of light to a micro-display panel (150). Light integrators (128), preferably shaped to correspond to the shape of the light emitting devices, are located such that a portion of each terminal is positioned adjacent to or in direct contact with the light emitting surface of the semiconductor dies.

6 Claims, 3 Drawing Sheets

OPTICAL ENGINE WITH TIGHTLY COUPLED LIGHT SOURCE

1. FIELD OF THE INVENTION

This invention generally relates to an optical engine for use with an image presentation device and, more specifically, an optical engine having tightly coupled semiconductor light emitting light source.

2. BACKGROUND OF THE INVENTION

In recent years, digital projection systems using spatial light valve modulators, including digital micro-mirror devices (DMDs) and transmissive liquid crystal displays, have been receiving much attention. These types of systems provide a high standard of display performance including high resolution, high brightness and a high contrast ratio. For example, a conventional DMD projection display system includes at least a light source, usually a high-pressure discharge lamp, a color wheel, a DMD, and an optical system. Most consumer DMD projectors employ color wheels to filter the incoming white light and provide sequential color light for illuminating the DMD panel. The color wheel devices are described in a numerous patents such as U.S. Pat. Nos. 5,680,180, 6,591,022, 6,767,100 and 6,830,343 which are herein incorporated by reference. One drawback of these types of prior art systems is that the color gamut of the projection system, with color wheel, is often limited due to the spectrum distribution of the white light source. Another inherent disadvantage is that the motor for driving the color wheel can be a source of ambient noise.

Additionally, short arc type discharge lamps such as mercury lamps, metal halide lamps and xenon lamps are widely used as the light source for the projection type display apparatus. However, there are some drawbacks with these types of short arc type discharge lamps. One of these is that all of the light except blue, green, and red will be filtered out resulting in a loss in efficiency. In addition, a fly-eye type of integrator or a light pipe optical integrator is required for collecting, homogenizing and guiding light from the light source. This has the effect of making the system very bulky and complex. Furthermore, there is a significant amount of ultraviolet (UV) and infrared (IR) light emitted from these lamps. The unfiltered UV light can work to reduce the operating lifetime of both the optical components and display panel in the system. The IR light can require means for providing additional cooling. To eliminate UV and IR light emitted from the lamp, UV/IR filters are generally employed that result in an increase in system complexity. Therefore, to avoid all aforementioned drawbacks of the previous illumination systems, it is desirable to devise an illumination apparatus that has an enhanced efficiency, prolonged lifetime, compact size and low cost to replace the short arc type discharge lamps used in current products.

Significant efforts have been dedicated towards utilizing light-emitting diodes (LEDs) in projection illumination systems as a light source. LEDs show great promise since they consume less power, release less heat, and can have a longer life time. The LEDs offer high light efficiency since all the spectrum of red, green and blue light from LEDs can be utilized. In addition, LEDs with three primary colors can produce a wider color gamut than conventional white lamps. An example of an LED light source having uniform light distribution can be found in U.S. Pat. No. 5,420,444.

Those skilled in the art will further recognize that light is not easily diffused using an LED-type light source and the output lumen power of an LED is generally much less than a short arc type discharge lamp. In practice, it is often a challenge to get a good uniform light beam from the LED source with the least amount of optical loss. Optical loss is typically caused by a fly-eye lens array or waveguides integrated into the projector illumination system. The prior art system as disclosed in U.S. Pat. No. 6,224,216 describes an embodiment of a triple path projector employing three single color LED arrays. These LED arrays emit light propagating along separated paths through fiber bundles to respective separated light pipe integrators and respective display devices. One disadvantage in this type of implementation is that the coupling between LEDs and fibers is often a problem. Practically, due to coupling and transmitting losses, it is difficult to efficiently couple light emitting from LED arrays to corresponding fiber bundles and light pipes.

In the invention described in U.S. Pat. No. 6,220,714, a projection system using LEDs for illumination is disclosed where light emitting from red, green and blue LEDs or LED arrays is collimated by condenser lenses. The light then propagates through fly-eye type of integrators for illuminating a single panel. Based on the geometry of the integrator lens, only the surface area of light-emitting region within a certain field of view can be effectively used for illuminating the panel. A similar system can be found in U.S. Pat. No. 6,644,814 that describes an LED-illumination-type DMD projector with one panel. Three sets of LED arrays are employed as light sources where three first fly-eye lenses are disposed in contact with respective red, green or blue LED arrays. The exit pupil of each element of the fly-eye lenses is illuminated by the LED array. A second fly-eye lens then forms images of the illuminated pupils of the first fly-eye lens and makes them overlapped on the DMD panel. The main problem with this system is that some light from the LEDs cannot enter the corresponding lens of the first and second fly-eye lenses due to aberration and aperture limitation of lens arrays. Thus, a portion of illumination light falls outside of the panel area resulting in low light efficiency and low contrast.

Accordingly, it has proven to be a challenge to provide an LED optical system for DMD projector that overcomes the shortcomings of the existing prior art LED illumination systems. The need exists to provide an optical light engine using LEDs that eliminate the use of a traditional homogenizer such as fly-eye lens arrays and integrator waveguides to avoid considerable optical loss. Furthermore, there is a need to provide an LED optical light engine system that offers advantages in compactness, simplicity and low cost.

3. BRIEF DESCRIPTION OF DRAWINGS

The above and other features and advantages of the invention will be further understood from the following description of the preferred embodiments thereof, taken in conjunction with the accompanying drawings.

4. DETAILED DESCRIPTION

The present description is directed in particular to elements forming part of, or cooperating more directly with, apparatus in accordance with the invention. As will be understood by those familiar with the art, aspects of the invention may be embodied in other specific forms without departing from the scope of the invention as a whole. Accordingly, the disclosures and descriptions herein are intended to be illustrative, but not limiting, of the scope of the invention which is set forth in the following claims.

Figure 1:
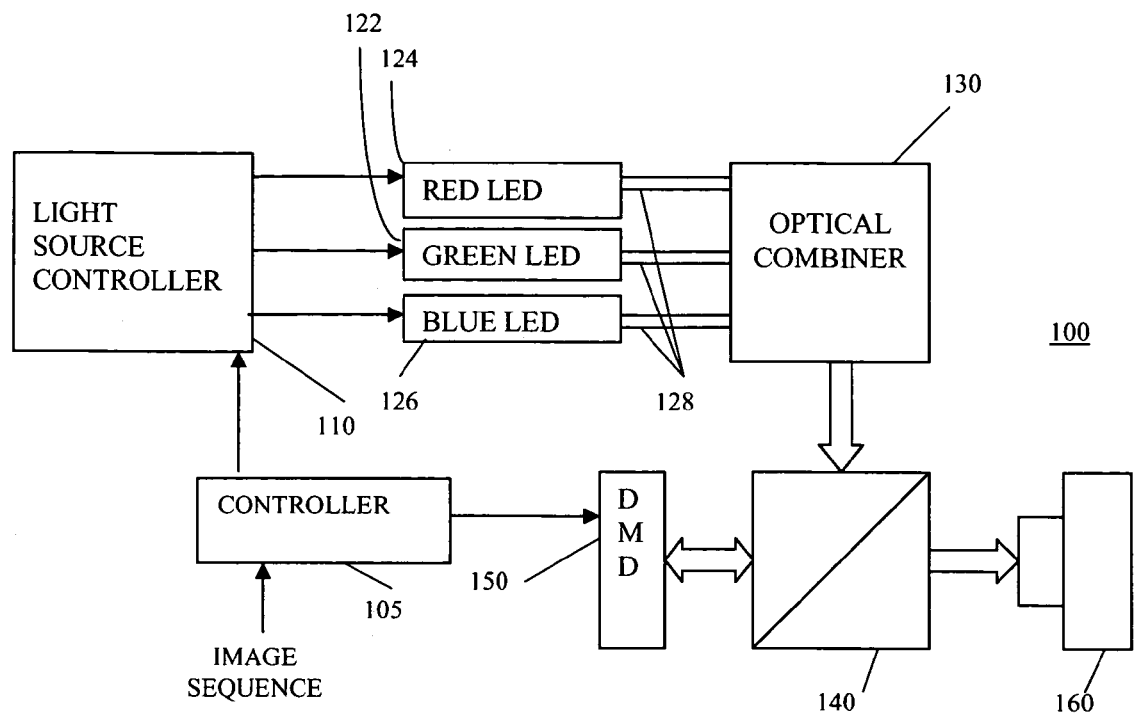
FIG. 1 is a block diagram illustrating an image presentation system employing a digital micro-mirror device (DMD), in accordance with a preferred embodiment of the invention.

FIG. 1 shows a digital micro-mirror device (DMD) based image presentation device 100, in accordance with the present invention. Only elements necessary for the understanding of the invention are shown since DMD based image projection systems are well known in the art. The image presentation device 100 of the present embodiment is a rear projection television system, but can easily be a front projector or other micro-display based system. The device 100 utilizes red, green, and blue light emitting diodes (LEDs) 122,124,126 as light sources. A primary advantage associated with the light source selection of the present invention is reduced cost and complexity when compared to prior art systems that employ color wheels and various light filtration systems that are typically required to generate basic colors within the color spectrum.

Light sources 122, 124,126 are individually controlled to output light to an optical combiner 130. The optical combiner is preferably formed from a combination of collimation lenses, condenser lenses, and dichroic prisms that together form part of a light engine for a DMD based system. Various aspects of light engines that may be used with the present invention are known in the art and will not therefore be described or discussed in further detail. The optical combiner is coupled to a prism 140 which redirects light output from the optical combiner 130 to a DMD panel device 150. The DMD panel device 150 comprises a large number of microscopic mirrors that, in conjunction with an image processing mode of operation, selectively reflect light through-the prism 140 and onto projection optics 160 for display on a screen (not shown) for viewing purposes. The DMD panel device 150 and light source controller 110 operate under the control of a controller 105 that manages both the image processing and non-image processing modes of operation of the device 100. Controller 105 is preferably a digital light processor (DLP) application specific integrated circuit (ASIC) which has, in the past, been commercially available from Texas Instruments corporation.

In contrast to the optical engines of the prior art, the red, green and blue LEDs 122, 124, 126 as used in the preferred embodiment of the invention are manufactured of a shape and dimension to exhibit an aspect ration substantially similar to that of the DMD panel 150, which typically has an aspect ratio of 16:9 or 4:3. The same is true of light integrator rods 128. As shown, light integrator rods 128 are disposed between LEDs 122, 124, 126 and optical combiner 130. Light integrator rods 128 operate to optically couple light from LEDs 122, 124,126 to optical combiner 130. In so doing, a 1:1 correspondence is provided such that the aspect ratio at the LED and the optical path, comprising light integrator rods 128, is equivalent to the aspect ratio of DMD panel 150. By maintaining tight aspect ratio tolerance, it can be said that the light output from the LEDs is directly imaged onto the DMD panel 150.

By way of illustration and not by way of limitation, it will be appreciated by those skilled in the art after review hereof, that light integrator rods 128 may consist of glass rods, fiber optic bundles, and the like to homogenize the light distribution from LED and provide uniformity illumination onto DMD panel devices 150. A particular problem associated with the use of such components is that some of the light emitted from the LED never enters the optical path, due to the large angle diffuse dispersion of light from the light emitting surface of the LED itself and limited certain distance between light emitting surface and LED package cover windows. Thus, a portion of illumination light falls outside of the coupling integrator rods 128 resulting in low light efficiency. In accordance with the present invention, it is extremely advantageous, therefore, to terminate, or said another way, position the receiving end of each light integrator 128 as close as possible to the light emitting surface of LED 122, 124,126 in order to avoid this loss of illumination.

Figure 2:
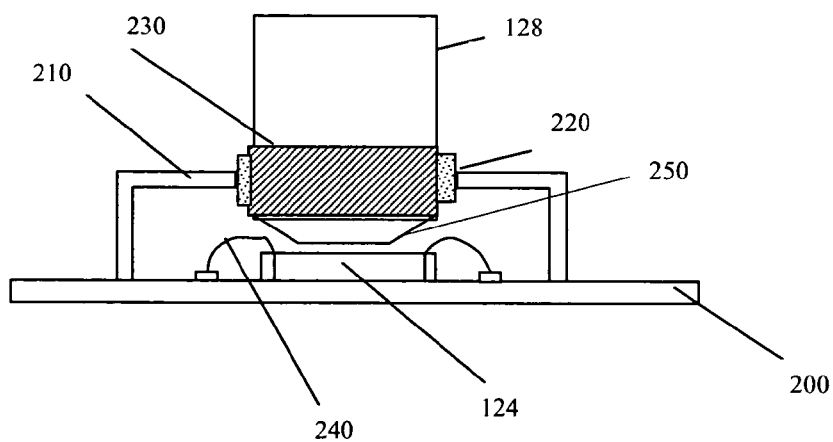
FIG. 2 is a diagram illustrating an embodiment of the LED optical engine assembly in accordance with a preferred embodiment of the invention.

FIG. 2 is a block diagram illustrating an embodiment of the LED optical engine assembly in accordance with a preferred embodiment of the invention. As shown, LED 124 is electrically coupled to printed circuit board 200 by way of wire bond connections 240. A substantially solid protective cover 210 surrounds the LED and provides environmental and mechanical protection for LED 124 as well as wire bond connections 240. Generally, protective cover 210 has been made of a transparent or translucent epoxy, such that light emitted from LED 124 passes through the cover and is visible outside the environmental shield of protection, however, in accordance with the present invention, no such requirement exists.

As depicted, there is an opening in the protective cover and a terminal portion of light integrator 128 extends through the opening and into close proximity to the light emitting surface of LED 124. The light integrator 128 is secured in place by means of an adhesive 220. In accordance with a preferred embodiment, the receiving end of light integrator 128 is positioned to within 100 microns of the light emitting surface of LED 124. In accordance with an alternative embodiment, the receiving end of light integrator 128 is positioned in direct contact with the light emitting surface of LED 124. In such configuration, a transparent adhesive, as is known in the art, may be applied to secure the terminal or receiving end of light integrator 128 to the light emitting surface of LED 124. In this embodiment, the light integrator 128 is formed to have a tapered portion 250 to avoid damaging wire bond contacts 240. As shown, the receiving end of the light integrator 128 is positioned adjacent to the light emitting surface of LED 124.

Referring back to FIG. 2, it will be noted that a portion of the terminal, also referred to herein as the receiving end of light integrator 128 has been treated by the application of a high internal reflective coating material 230. The reflective coating material may consist of materials such as, but not limited to: internal reflective silver coating or high reflective film. Upon close observation, it will be noted that the high reflective material 230 is applied in an area adjacent to the adhesive application 220. In the preferred embodiment, light is conducted through the light integrator 280 using the principles of internal reflection based on the difference in the refractive index of the light integrator material, such as glass, and the surrounding medium, such as air. The application of adhesive layer 220 on light integrator 128 would alter the relative refractive indices, thereby potentially affecting the light propagating therein and resulting in a loss of efficiency. To address this condition, the high reflective coating 230 is applied to the integrator 128 in that region adjacent to the adhesive application 220 in order to preserve and maintain the overall efficiency for the coupling of light from the LED to the combiner.

Figure 3:
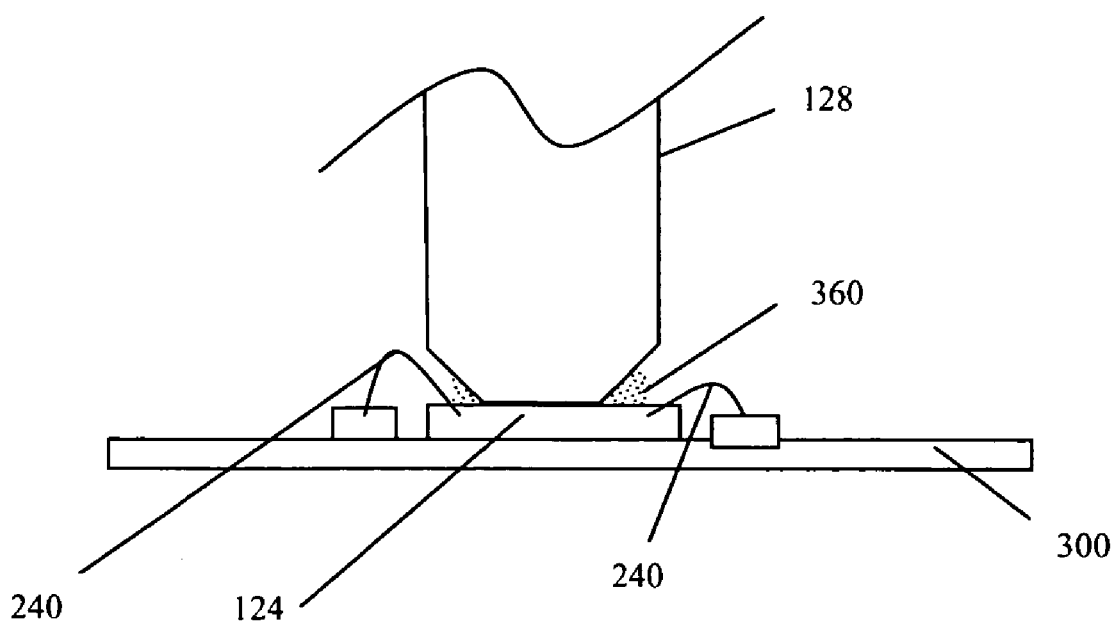
FIG. 3 is a diagram illustrating another embodiment of an LED optical engine assembly in accordance with another embodiment of the invention.

FIG. 3 is a block diagram illustrating another embodiment of an LED optical engine assembly in accordance with the present invention. As shown, LED 124 is again electrically coupled to a printed circuit board 300 by way of wire bond connections 240. As depicted, the terminal end of light integrator 128 is directly connected to the light emitting surface of LED 124. The light integrator 128 is secured to LED 124 by means of a-transparent adhesive application 360. As shown, the terminal end of light integrator 128 is structured to avoid damaging wire bond contacts 240 during device manufacture and/or assembly.

Figure 4:
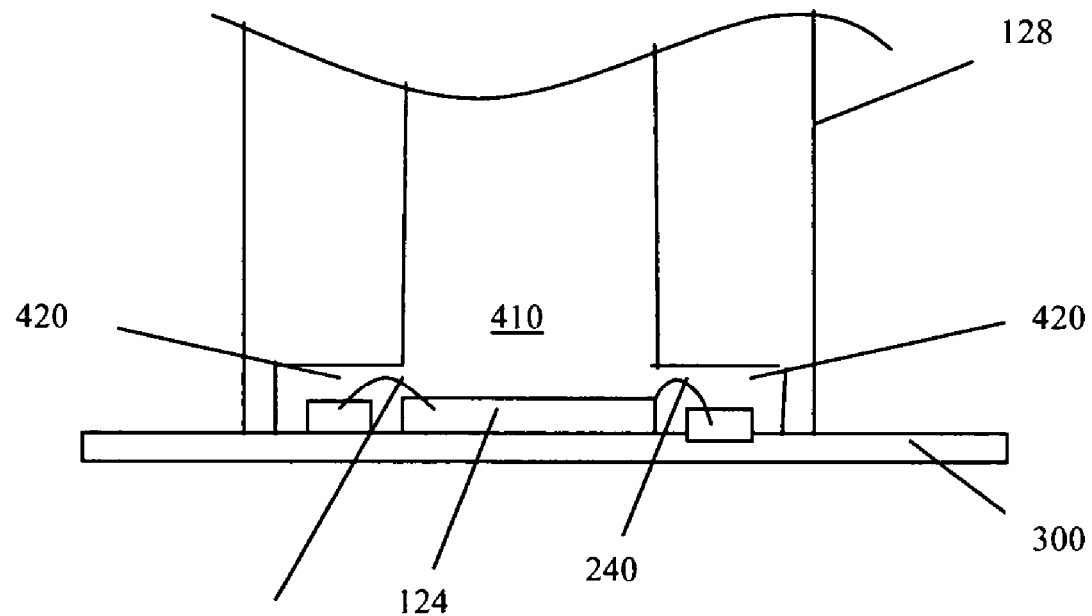
FIG. 4 is a diagram illustrating yet another embodiment of the LED optical engine assembly in accordance with a preferred embodiment of the invention.

FIG. 4 is a diagram illustrating yet another embodiment of the LED optical engine assembly in accordance with a preferred embodiment of the present invention. As shown, light integrator 128 is formed from a substantially hollow glass or plastic material, having a rectangular shaped input/output end corresponding to a preferred aspect ratio, which in the preferred embodiment is 4:3 or 16:9. As depicted, a hollow portion 420 of light integrator 128 surrounds and completely covers LED 124 and is mechanically connected to printed circuit board 300 to provide environmental protection for LED 124 as well as the wire bond connections 240. As further depicted, the hollow light pipe 400 is positioned directly over the light emitting surface of LED 124. In accordance with a preferred embodiment, the terminal or receiving end 410 of the integrator is positioned at a point within 100 microns of the light emitting surface of LED 124.

Figure 5:
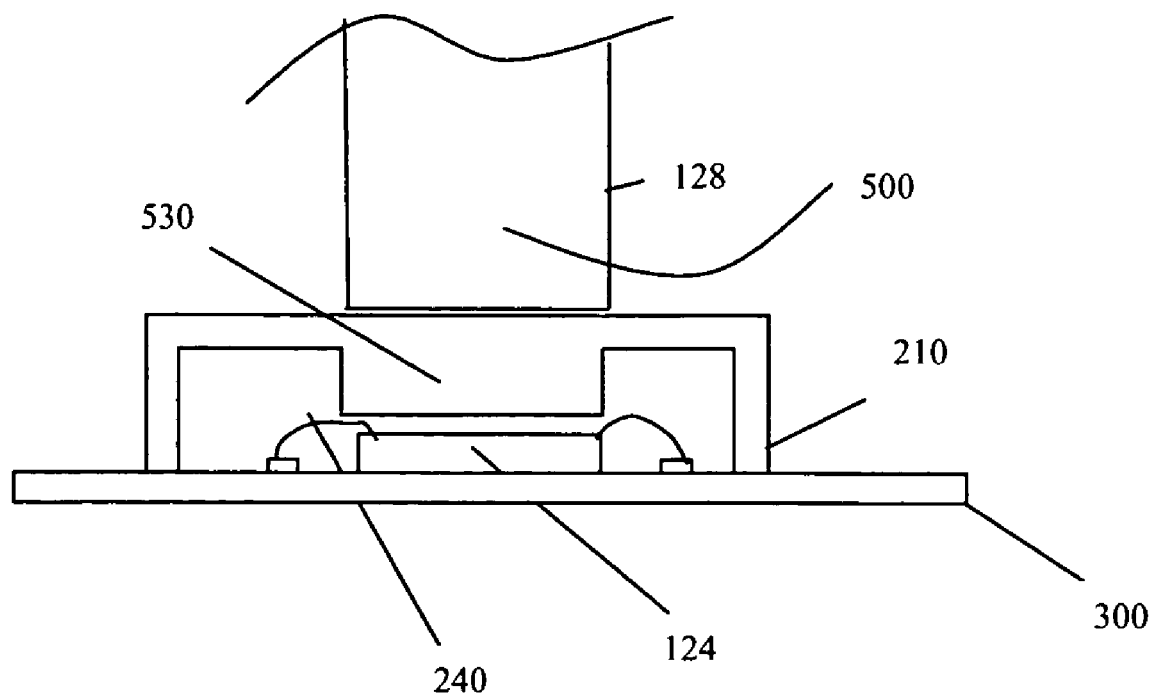
FIG. 5 is a diagram illustrating an alternative embodiment of an LED optical engine assembly in accordance with another embodiment of the invention.

FIG. 5 is a diagram illustrating an alternative embodiment of an LED optical engine assembly. As shown, the receiving end 500 of light integrator 128 is positioned proximate to protective cover 210. As previously discussed, the protective cover is generally made from any of a well known class of transparent and/or translucent materials capable of transmitting light emitted from the light emitting surface of LED 124. Here, the protective cover has been modified to include a transparent and/or translucent member 530 that extends or projects toward, and is positioned adjacent, to the light emitting surface of LED 124. In accordance with the present invention, transparent/translucent member 530 operates as the receiving end of the optical engine's optical path, and thus forms a part of the light integrator. The transparent/translucent member 530 is preferably made from fiber optics bundles or face plates or other material structured for unidirectional light transmission. As such, the transparent/translucent member 530 of protective cover 210 is positioned at a point to minimize loss from the light emitting surface of LED 124. In accordance with a preferred embodiment, the transparent/translucent member 530 of protective cover 210 is positioned within 50 microns from the light emitting surface of LED 124. Light emitted from the LED 124 is received by transparent/translucent member 530, transmitted to light integrator 128 via the cover 210, and propagated to optical combiner 130 as previously taught herein. By advantageously positioning the terminal/receiving end of the optical engine optical path in such close proximity to the light emitting surface of LED 124, the present invention exhibits substantial improvement in optical efficiency and contrast performance.

In conclusion, the present invention provides for a highly efficient optical engine system for use in microdisplay projection applications, such as DMD based presentation devices. The use of the optical light engine in other types of microdisplay based applications, such as those employing liquid crystal display panels are contemplated. In the preferred embodiment, light from multicolored LED light sources is collimated through collimation lenses, combined using a dichroic combiner, and synchronized with the operation of a DMD panel. Preferably, a condenser lens is used for projecting the light from the LED light sources onto the DMD panel, and prisms are used for reflecting and transmitting the resulting DMD based image through a projection lens onto a presentation screen. By integrating the combiner in between the collimation lens and condenser lens, and by using this combination to directly image the LED onto the DMD panel, a compact light engine system is provided that has substantial efficiency. Other performance enhancements include increased overall efficiency by reducing the distance between the terminal or receiving end of the optical path and the light emitting surface of the LED. This has the benefit of decreasing system optical losses while enhancing overall system light efficiency and contrast performance. In addition, the present invention allows for the color gamut of the imaging to be greatly improved. Fly-eye lens arrays associated with traditional light integrator pipes and unwanted UV and IR light can be eliminated. This has the benefit of decreased heat and long operating life of the light source. As compared with prior art light engine systems, fans, complex bulky heat sinking apparatus and ballast circuit can also be eliminated. Moreover, normally required color wheel, driver circuit and stepper motors are also no longer needed, thereby reducing the overall cost and complexity of the projection system.

While the preferred embodiments of the invention have been illustrated and described, it will be clear that the invention is not so limited. Numerous modifications, changes, variations, substitutions and equivalents will occur to those skilled in the art without departing from the spirit and scope of the invention as defined by the appended claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An optical engine assembly comprising:
a micro-display panel for generating images
a light emitting diode (LED) having a surface for producing light, the LED having a light emitting area having a rectangular shape of a particular dimension and an aspect ratio of 4:3 or 16:9; and
a light integrator disposed between the LED and the optical combiner for coupling light from the LED and for directing the light toward the micro-display panel, the light integrator being structured to capture and homogenize substantially all of the light from the LED;
wherein the light integrator has a light receiving end that terminates within 100 microns from the light emitting area of the LED, the light receiving end being shaped and dimensioned to have a 1:1 correspondence with the shape, dimension, and aspect ratio of the light emitting area of the LED.

2. The optical engine assembly of claim 1, wherein the light integrator directly contacts the light emitting surface of the semiconductor die.

3. The optical engine assembly of claim 1, wherein the light integrator is secured to the light emitting surface via transparent adhesive.

4. The optical engine assembly claim 1, further comprising a protective cover disposed over the semiconductor die, the protective cover having an opening therein, the light integrator having a portion extending through the opening and positioned adjacent to the light emitting surface of the semiconductor die.

5. The optical engine assembly of claim 1 wherein:
the light receiving end is formed by a hollow portion of the light integrator that is disposed over the light emitting area of the LED.

6. An optical engine assembly comprising:
a micro-display panel for generating images, the micro-display panel having a particular shape and aspect ratio;
a semiconductor die having a light emitting area for producing light, the light emitting area having a particular dimension with a shape and aspect ratio that corresponds to that of the micro-display panel;
an optically conductive light integrator for coupling the light from the semiconductor die and for directing the light toward the micro-display panel, the light integrator having a structure that homogenizes the light to uniformly illuminate the micro-display panel, the light integrator having a light receiving end dimensioned and shaped to have a 1:1 correspondence to the dimension and shape of the light emitting area of the semiconductor die; and wherein the light receiving end is formed by a hollow portion in the optically conductive light integrator, and the light receiving end of the light integrator optically interfaces with the light emitting area, within 100 microns, such that there are no intervening structural elements there between.

* * * * *